May 22, 1923.
E. R. JONES
TOY
Filed July 28, 1919
1,456,239
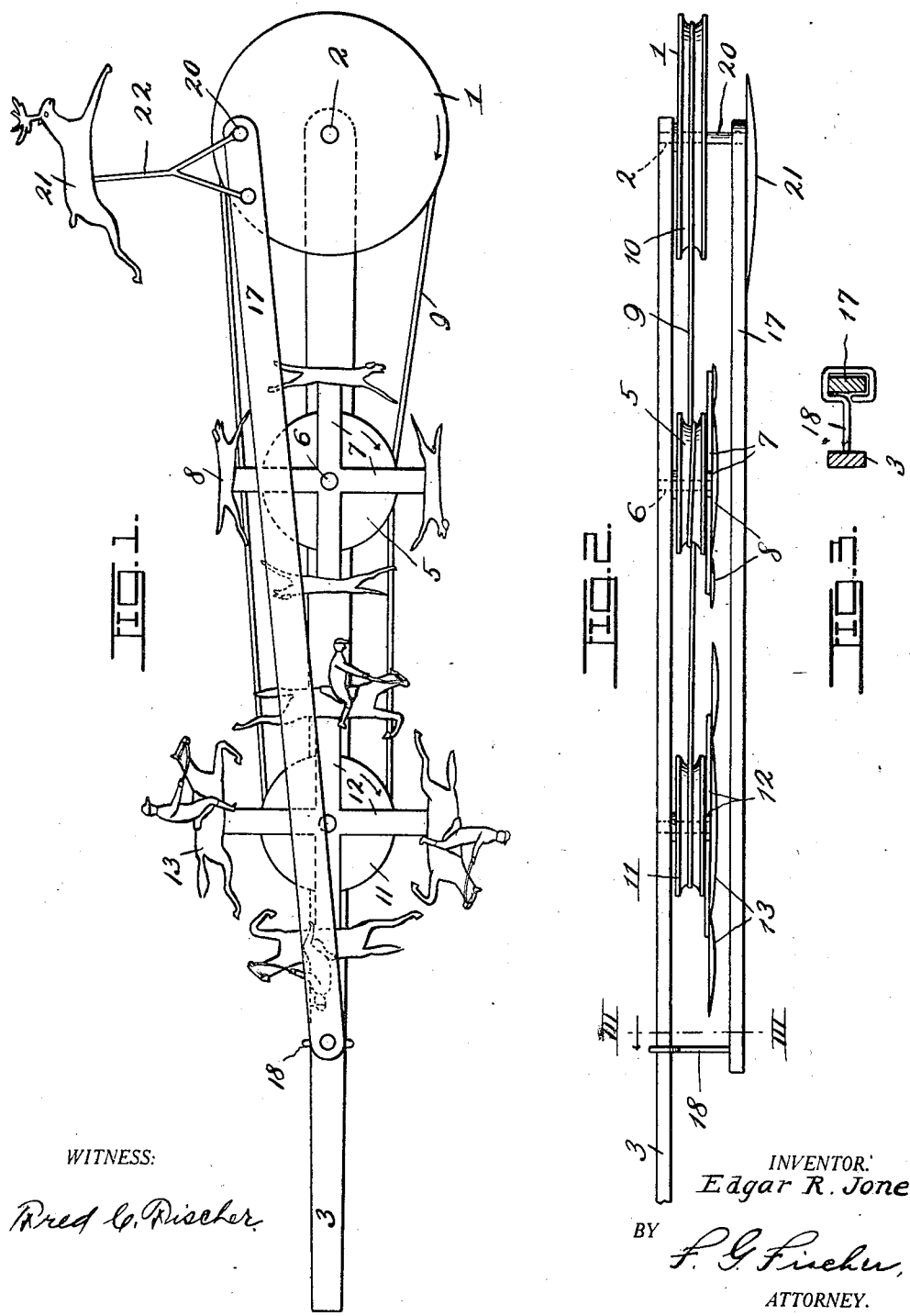
INVENTOR.
Edgar R. Jones,
BY
ATTORNEY.
WITNESS:

Patented May 22, 1923.

1,456,239

UNITED STATES PATENT OFFICE.

EDGAR R. JONES, OF KANSAS CITY, MISSOURI.

TOY.

Application filed July 28, 1919. Serial No. 313,737.

*To all whom it may concern:*

Be it known that I, EDGAR R. JONES, a citizen of the United States, residing at Kansas City, in the county of Jackson and State of Missouri, have invented certain new and useful Improvements in Toys, of which the following is a specification.

My invention relates to improvements in toys, and my object is to provide a novel device of this character embodying a plurality of rotary wheels and moving animals designed for the amusement of children.

In order that the invention may be fully understood, reference will now be made to the accompanying drawing, in which:

Fig. 1 is a side elevation of the device.

Fig. 2 is a plan view thereof.

Fig. 3 is a cross sectional view taken on line III—III of Fig. 2.

In carrying out the invention, a relatively large tractor wheel 1 is employed. Said wheel 1 is mounted upon a stub shaft 2, secured to a handle 3.

A second wheel or sheave 5 is rotatably mounted upon a stub shaft 6 secured to the handle 3. Said sheave 5 is provided with fixedly mounted radial arms 7, each carrying an animal such as a dog 8. The sheave 5 is driven by a belt 9 running around said sheave and the tractor wheel 1, which latter has a peripheral groove 10 to receive the belt.

11 designates another sheave similar to the sheave 5, and having a plurality of radial arms 12, carrying figures 13, such as horses with riders. Said sheave 11 is propelled by the belt 9, so that the animals or figures on the arms 12 are caused to rotate when the device is in motion.

17 designates a connecting rod mounted at its rear end upon a bracket 18, one end of which loosely embraces the handle 3 and is slidable thereon. The opposite end of said connecting rod 17 is mounted upon a pivot 20 projecting from the tractor wheel 1 at a point near its periphery, so that when said wheel 1 rotates it will impart a rotary movement to the forward end of the rod 17.

A deer 21, or other animal, is mounted upon a support 22 fixedly mounted at the forward end of the connecting rod 17, so that when the toy is in motion, said deer will appear to be bounding along over the ground.

In practice, when the toy is being used by a child, it is grasped by the handle 2, which is held in an inclined position with the tractor wheel 1 resting upon the floor or ground, as the case may be. The toy is then pushed forward, causing the tractor wheel 1 to rotate, which in turn drives the sheaves 5 and 11 carrying the dogs 8 and the horses 13, respectively, through the intermediacy of the belt 9. The connecting rod 17 is also given an oscillatory motion by rotation of the tractor wheel 1, causing the deer 21 to appear to be bounding along, with the dogs and horsemen in hot pursuit.

Having thus described my invention, what I claim and desire to secure by Letters Patent, is:

1. In a device of the character described, a handle, a tractor wheel mounted directly upon the forward end of said handle, a second wheel mounted directly on the handle at the rear of the tractor wheel, a third wheel mounted directly on the handle at the rear of the second wheel, radial arms fixed to the second and third wheels, figures fixed to said radial arms, and a single belt running around said wheels to transmit motion from the tractor wheel to the second and third wheels.

2. In a device of the character described, a handle, a tractor wheel mounted directly upon the forward end of said handle, a second wheel mounted directly on the handle at the rear of the tractor wheel, a single belt running around said wheels to transmit motion from the tractor wheel to said second wheel, radial arms fixed to the second wheel to rotate therewith, figures fixed to said radial arms, a connecting rod pivotally connected at its forward end to the tractor wheel, a bracket fixed to the rear end of said connecting rod and slidably engaging the handle, and a figure associated with the connecting rod.

In testimony whereof I affix my signature. in the presence of two witnesses.

EDGAR R. JONES.

Witnesses:
F. G. FISCHER,
L. J. FISCHER.